US008045728B2

(12) United States Patent
Wada et al.

(10) Patent No.: US 8,045,728 B2
(45) Date of Patent: Oct. 25, 2011

(54) CONFERENCE AUDIO SYSTEM

(75) Inventors: Ariisa Wada, Machida (JP); Tatsuji Harima, Machida (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 820 days.

(21) Appl. No.: 11/996,697

(22) PCT Filed: Jul. 27, 2005

(86) PCT No.: PCT/JP2005/014145
§ 371 (c)(1),
(2), (4) Date: May 27, 2008

(87) PCT Pub. No.: WO2007/013180
PCT Pub. Date: Feb. 1, 2007

(65) Prior Publication Data
US 2010/0142721 A1 Jun. 10, 2010

(51) Int. Cl.
*H04B 3/00* (2006.01)
(52) U.S. Cl. ........................................................ 381/77
(58) Field of Classification Search ..................... 381/77
See application file for complete search history.

(56) References Cited

U.S. PATENT DOCUMENTS

| | | | | |
|---|---|---|---|---|
| 6,094,213 | A * | 7/2000 | Mun et al. | 348/14.05 |
| 7,650,285 | B2 * | 1/2010 | Magliaro et al. | 704/500 |
| 2003/0220971 | A1 * | 11/2003 | Kressin | 709/204 |
| 2005/0152561 | A1 * | 7/2005 | Spencer | 381/77 |
| 2005/0271220 | A1 * | 12/2005 | Bathurst et al. | 381/92 |

FOREIGN PATENT DOCUMENTS

| | | | |
|---|---|---|---|
| JP | 60-142805 | A | 7/1985 |
| JP | 60-163250 | A | 8/1985 |
| JP | 7-170334 | A | 7/1995 |
| JP | 8-265337 | A | 10/1996 |
| JP | 2001-333402 | A | 11/2001 |
| JP | 2005-57402 | A | 3/2005 |

* cited by examiner

*Primary Examiner* — Thao P. Le
(74) *Attorney, Agent, or Firm* — Sughrue Mion, PLLC

(57) ABSTRACT

It is possible to shorten a delay time from utterance to output from a speaker even in a conference audio system including an automatic mute release device. An A/D converter that converts audio signals from a plurality of microphones into digital signals, an audio level detector that detects utterance or silence depending on the level of the converted digital signal, an audio data storage unit that temporarily stores the digital signal for which the audio level detector detected utterance, a controller that controls the storage of audio data in the audio data storage unit and the reading of the audio data, and a D/A converter that converts the read audio data into analog audio signals are provided. The controller hastens read timing of the audio data in accordance with a time period of silent portion when the audio level detector detects silence in a series of the audio data.

12 Claims, 6 Drawing Sheets

CONFERENCE AUDIO SYSTEM

TECHNICAL FIELD

The present invention relates to a conference audio system and, more particularly, to a conference audio system capable of avoiding front-end-clipping of delayed speech in a cordless audio conferencing system using infrared light.

BACKGROUND ART

When a conference attended by many persons is held, a conference audio system is used, in which speaker's utterance is picked up by a microphone, amplified by an amplifier, and output from a speaker in a conference hall so that the speaker's utterance can be heard by all attendees. In such a conference that uses a conference audio system, many microphones are used. If many microphones are being turned on at the same time, that is, in an active state, audios picked up by these microphones are amplified and output from the speaker, and therefore, audios other than those of the speaker are heard as noises and the audio of the speaker cannot be heard clearly. In addition, a howl becomes more likely to occur. Because of this, a system has been widely used, in which an attendee turns on a microphone switch at hand when making a statement and turns off the switch after completing the statement. FIG. 6 shows a concept of the system.

In FIG. 6, on a table 1 in a conference hall, many microphones 11, 12, . . . , and in are arranged erectly on microphone stands 21, 22, . . . , and 2*n*. There are cases where each person uses each microphone and where two or more persons share one microphone. The microphone stands 21, 22, . . . , and 2*n* are each provided with a switch with which each microphone is turned on or off by the operation of an attendee. Audio signals from a microphone that has been turned on by the switch operation are input to a mixer 2 and the audio signals mixed in the mixer 2 are amplified by an amplifier 3 and the audios are output toward the attendees from a speaker 4 installed in the conference hall.

According to the above audio system, there occurs a time delay from when an attendee utters until the audio is converted into a signal in the microphone, mixed in the mixer 2, amplified by the amplifier 3, and output from the speaker 4. FIG. 7 shows the time delay. A waveform a represented by the solid line shows an attendee's utterance signal and a waveform b represented by the dotted line shows an audio signal from the speaker 4. As shown in FIG. 7, there occurs a time delay Δt between the waveform a and the waveform b. However, in a wired system as shown in FIG. 6, in which the microphone is turned on/off by manual operation, the time delay Δt is about 10 ms and there will arise no auditory problem because there is no auditorily uncomfortable feeling.

However, in the wired audio system as described above, it is necessary to connect all of the microphones with the mixer 2 by cables, and therefore, many cables are laid and it will be troublesome to handle the cables physically and to put them in order, and further, it will also be troublesome to identify the correspondence relationship between microphones and cables. The installation cost also becomes high.

Because of this, a conference audio system of cordless type as shown in FIG. 8 is proposed. In FIG. 8, the microphones 11, 12, . . . , and 1*n* stand respectively on microphone stands 31, 32, . . . , and 3*n* placed on the table. Each of the microphone stands 31, 32, . . . , and 3*n* incorporates a transmitter and transmits an audio signal converted in the microphone to a receiver 5. This transmission/reception system may be an optical communication system that uses infrared light etc., or a communication system that uses radio waves. The receiver 5 demodulates the received signal into an audio signal and the amplifier 3 amplifies the demodulated signal, and thus the audio is output from the speaker 4 installed in the conference hall toward the attendees.

On the other hand, in a system in which an on/off switch is attached to each microphone and an attendee needs to operate this switch, it may be troublesome to operate the switch and there may be a case where the attendee forgets to turn on the switch when making a statement or to turn off after his/her statement. Because of this, a conference audio system equipped with an automatic mute release device is proposed. In this system, an audio level detector is provided, which detects utterance or silence depending on whether or not the output level of each microphone exceeds a predetermined level, and normally, the microphone is put in an off state, that is, in a state of mute, and the audio level detector, when detecting utterance, turns on the microphone, that is, the mute is released. The automatic mute release device can also be applied to a wired system shown in FIG. 6 and a cordless system shown in FIG. 8.

In an elementary technique of an automatic mute release device, an audio level picked up by a microphone is detected and when the audio level becomes equal to or exceeds a predetermined threshold level (hereinafter, referred to as a "threshold"), the audio signal converted in the microphone is turned on. However, such an elementary technique of an automatic mute release device has a problem in that it takes time from when voice utterance enters the microphone until an audio signal is turned on, and the time delay Δt shown in FIG. 7 is about 100 to 200 ms and the beginning of speech may be lost.

As a technique to eliminate such a time delay, a method of automatically detecting beginning of speech is proposed, in which when an analog audio signal level from a microphone is equal to or greater than a threshold, a voice switch is turned on and while the voice switch is on, a digital recording circuit is activated and at the same time, the analog audio signal is input to a digital recording circuit for digital recording with a delay by a delay circuit corresponding to the maximum operation delay time when the voice switch is switched from the off-state to on-state (for example, refer to Patent document 1). The application of the technique described in Patent document 1 to a conference audio system will result in always causing a fixed time delay between when voice utterance is picked up by a microphone and when the audio is output from a speaker. Owing to this, there is no problem relating to the loss of beginning of speech. However, since both the words uttered directly by the speaker him/herself and the words of his/her own output from the speaker delayed in time are heard at the same time, the speaker will have an uncomfortable feeling. Further, since there is a discrepancy with respect to time between the movement of the lip of the speaker and the audio output from the speaker, the attendees other than the speaker also have an uncomfortable feeling. As described above, the time delay is always about 100 to 200 ms, and therefore, it is desired to solve this problem technically.

A recording device based on the same concept as that of the invention described in Patent document 1 is also known, which uses a tape recorder by an endless tape in place of a digital recording circuit (for example, refer to Patent document 2). The application of the invention described in Patent document 2 to a conference audio system will also result in the same problem as that encountered when the invention described in Patent document 1 is applied to a conference audio system.

Further, an audio communication recording device is proposed, in which an audio signal input from a microphone is converted into a digital signal and when the quantity of data stored in an FIFO buffer reaches a predetermined quantity, if there is no audio signal, the data is discarded and if there is an audio signal, the data is stored in the buffer or transmitted (refer to Patent document 3). The invention described in Patent document 3 states that it is possible to realize a natural conversation because a delay time between when the audio signal is received and when the audio is heard is short. However, when the invention described in Patent document 3 is applied to a conference audio system, if the audio signal is interrupted and it is determined that there is no audio signal, the audio data stored in the buffer is discarded, and when it is determined that there is an audio signal next time, the audio signal is stored sequentially from scratch and read out in order, and therefore, the effect to eliminate the delay in audio cannot be expected.

Patent document 1 Japanese Unexamined Patent Application Publication No. 60-163250

Patent document 2 Japanese Unexamined Utility Model Application Publication No. 60-142805

Patent document 3 Japanese Unexamined Patent Application Publication No. 8-265337

DISCLOSURE OF THE INVENTION

The present invention has been achieved in order to eliminate the problems of the prior art as described above, and an object thereof is to provide a conference audio system capable of eliminating an uncomfortable feeling by reducing the delay time between the utterance toward a microphone and the output of the audio from a speaker even in a system including an automatic mute release device that automatically turns on only the microphone that has picked up the audio when the audio is uttered.

The present invention includes a plurality of microphones, an analog/digital converter that converts an audio signal from each microphone into a digital signal, an audio level detector that detects utterance or silence depending on whether or not the level of the converted digital signal exceeds a predetermined level, an audio data storage unit that temporarily stores the digital signal detected its utterance by the audio level detector and converted by the analog/digital converter, a controller that controls the storage of audio data to the audio data storage unit and the reading of the stored audio data, and a digital/analog converter that converts the read audio data into an analog audio signal, and the reading controller hastens a read timing of the audio data in accordance with a time period of silent portion when the audio level detector detects silence in a series of the audio data.

According to the present invention, when a word is uttered toward a microphone, the audio level detector detects the utterance and the audio data storage unit stores audio data picked up by the microphone and converted digitally. The stored audio data is read under the control of the controller and converted into an analog signal. If the utterance toward the microphone is interrupted temporarily due to breathing etc., the audio level detector determines the state as silence and hastens the read timing of the audio data by the time period corresponding to the silent time. As a result, at the beginning of the utterance, the audio is converted into an analog signal with a delay from the time point of utterance, however, when the utterance is interrupted temporarily, the audio is converted into an analog signal with a delay time reduced by the time period of interrupt, and then, the audio is converted into an analog signal substantially in synchronization with the utterance. If, for example, the speaker is driven by the analog signal, although there occurs a time delay only at the beginning of the utterance, soon the audio is output from the speaker without time delay, and it is possible to obtain a conference audio system without an uncomfortable feeling.

BRIEF DESCRIPTION OF THE DRAWINGS

FIG. 2(A) shows a standby state for utterance; FIG. 2(B) shows a state immediately after utterance is detected; and FIG. 2(C) shows a state immediately after silence is detected.

DESCRIPTION OF SYMBOLS

31 CPU as a controller
32 audio data storage unit
33 analog/digital converter
34 digital/analog converter
35 audio level detector

DESCRIPTION OF THE PREFERRED EMBODIMENT

Figure 1:
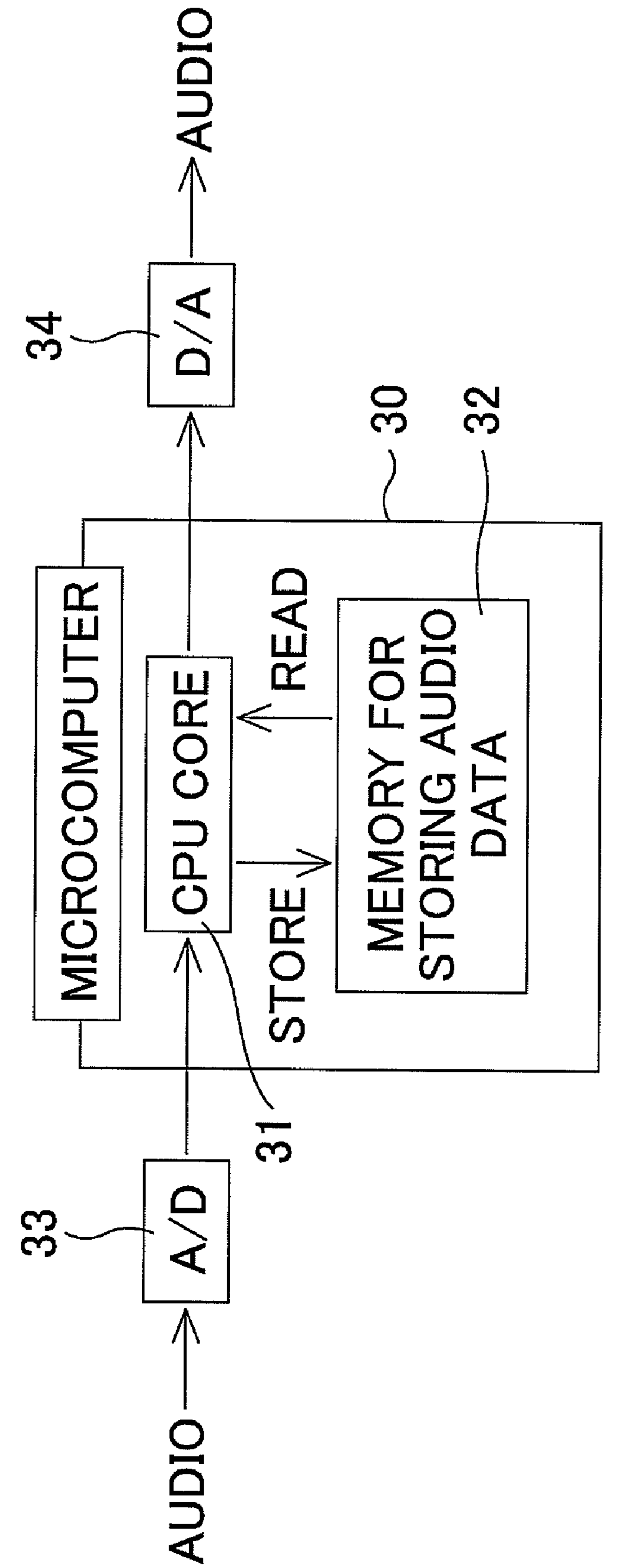
FIG. 1 is a block diagram showing essential parts in an embodiment of a conference audio system according to the present invention.

An embodiment of a conference audio system according to the present invention will be described below with reference to the drawings. FIG. 1 shows essential parts in the embodiment of the conference audio system according to the present invention, however, a microphone which is an entrance of an audio signal, a speaker which is an outlet of an audio, an amplifier provided before the speaker, etc., are not shown schematically. The constitutional parts shown in FIG. 1 are arranged in accordance with each microphone.

In FIG. 1, in accordance with each microphone, an analog/digital converter 33 is arranged, which converts an audio signal, which is an analog signal converted by each microphone, into a digital signal. The digital audio signal converted by the analog/digital converter 33 is input to a central processing unit (hereinafter, referred to as "CPU") 31 in a microcomputer 30. The microcomputer includes a read-only-memory (ROM), a random-access-memory (RAM), etc., with the CPU 31 as a controller as the central component. In the present embodiment, the RAM is used as an audio data storage unit 32. The CPU 31 as a controller carries out the control to store the audio data in the audio data storage unit 32 and the control to read the audio data from the audio data storage unit 32. The digital audio data read from the audio data storage unit 32 is converted into an analog audio signal by a digital/analog converter 34 and a speaker is driven by the analog audio signal via an amplifier not shown schematically and the audio is output from the speaker.

Figure 6:
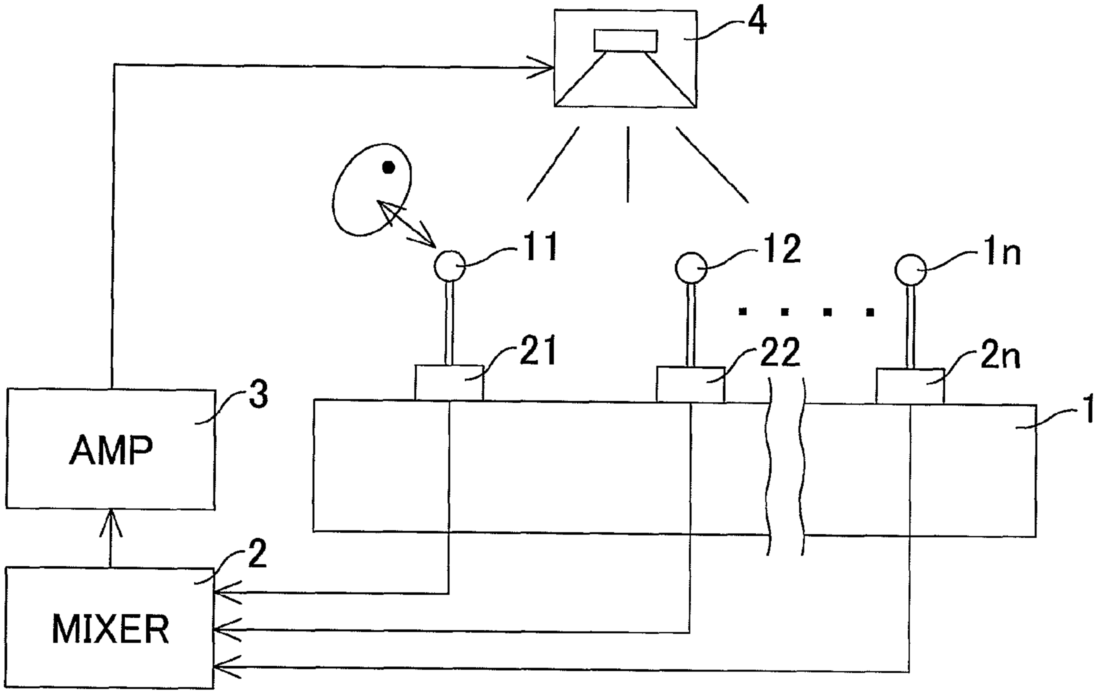
FIG. 6 is a conceptual diagram showing an example of a conventional wired audio conferencing system.
Figure 7:
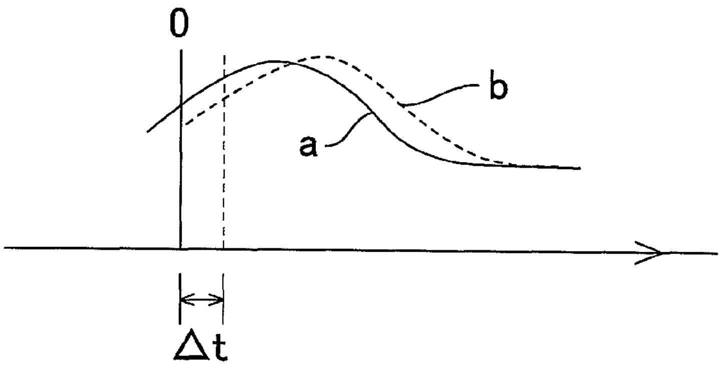
FIG. 7 is a waveform diagram showing a delay in audio in a conference audio system.
Figure 8:
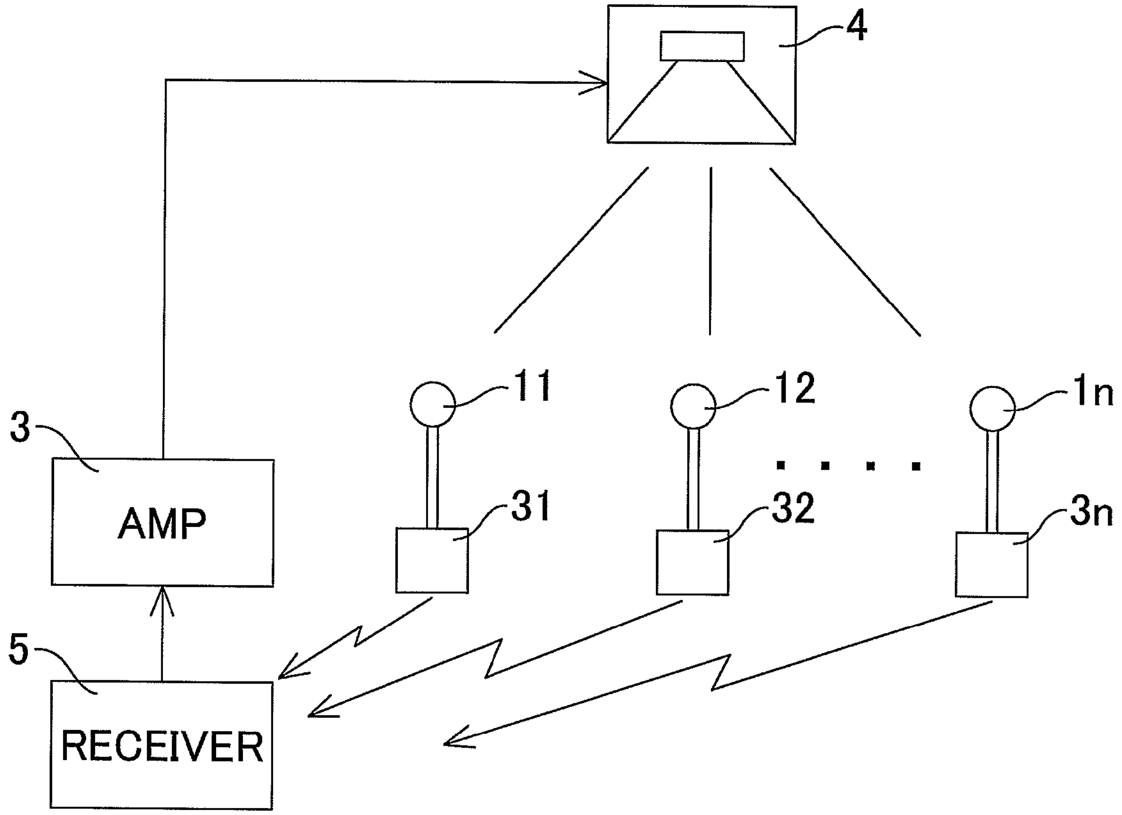
FIG. 8 is a conceptual diagram showing an example of a conventional cordless audio conferencing system.

Although not shown in FIG. 1, the analog signal converted by the digital/analog converter 34 in each microphone is input to the mixer as described with reference to FIG. 6 via, for example, a cable, or the analog signal is transmitted from the cordless signal transmitter as described with reference to FIG. 8 and received by the receiver to drive the speaker via the amplifier. To the mixer or receiver, audio signals from a number of microphones, or light signals or radio waves modulated by the audio signal are sent. However, in a state in which there is no utterance toward the microphone, there is no transmission of the audio signal, light signal, or radio wave to the mixer or receiver because of automatic mute. When there is utterance toward the microphone, the automatic mute is released by an automatic mute release device and the audio signal, light signal, or radio wave is sent to the mixer or receiver, and the audio signal or demodulated audio signal is output from the speaker.

Figure 2:
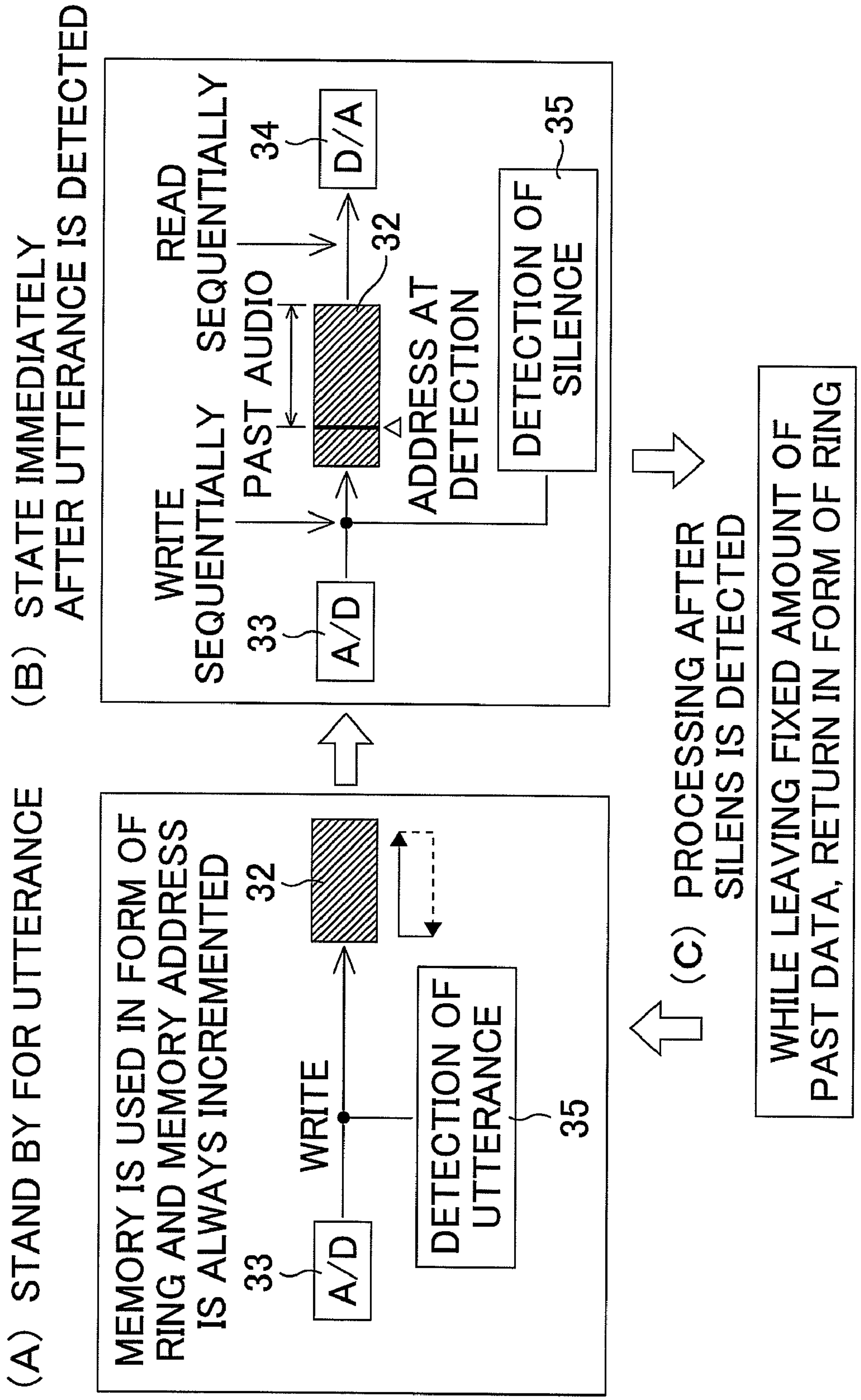
FIGS. 2(A) to 2(C) are block diagrams showing the operation in the embodiment.

The embodiment of the present invention is characterized by the audio data storage unit 32 and the control of the audio data storage unit by the CPU 31 as s controller. The configuration and operation of the characteristic parts are described below. FIG. 2(A) shows an image of a standby state for utterance by the audio level detector. The audio level detector detects utterance or silence depending on whether or not the level of the digital audio signal picked up by the microphone and converted by the analog/digital converter 33 exceeds a predetermined level, that is, a threshold, and the detector itself is a well-known technique. In FIG. 2(A), the block denoted by "detection of utterance" corresponds to an audio level detector 35. The audio level detector 35 detects the level of the digital audio signal and stores the digital audio signal in the audio data storage unit 32 when the level exceeds the threshold. The audio data storage unit 32 uses a memory with a fixed amount of capacity in the form of a ring and always increments the memory address regardless of the detection by the audio data storage unit. In other words, the digital audio data is stored sequentially in each address and rewritten. The control of the memory is carried out by the controller 31.

FIG. 2(B) shows an image of a state immediately after the audio level detector 35 detects utterance. When the audio level detector 35 detects utterance, the controller 31 sequentially writes the digital audio data in the audio data storage unit 32. Further, the controller 31 causes the digital audio data to be read sequentially from the audio data storage unit 32 with a predetermined time delayed from the point of time of the detection of utterance, for example, of about 100 to 200 ms, which will occur inevitably. As a result, the writing to the audio data storage unit 32 and the reading from the audio data storage unit 32 are carried out at the same time. In FIG. 2(B), the audio data stored in the audio data storage unit 32 is represented by "past audio", however, the wording "past" used here means "immediately before" and therefore the "past audio" means the audio immediately before the data is read. In this manner, immediately after the audio level detector 35 detects the utterance, the audio is output from the speaker with a fixed time delay. In this operation mode, the audio level detector 35 is ready to detect silence.

In the above operation mode, when the audio level detector 35 detects silence, the controller 31 stops the writing to the audio data storage unit 32 at that point of time, however, causes the reading from the audio data storage unit 32 to continue. FIG. 2(C) shows this operation. When the period of time of silence is a comparatively brief time about the same as that of breathing and the time required for the audio level detector 35 to detect utterance again is shorter than the fixed time of about 100 to 200 ms, the controller 31 causes the reading to continue. As a result, at this point of time, the time delay of the audio output from the speaker is shortened by the time period corresponding to the above silent time. When the audio level detector 35 detects silence due to the temporary interrupt of audio again, the controller 31 stops the writing to the audio data storage unit 32, however, causes the reading from the audio data storage unit 32 to continue. Then, at the point of time when the audio level detector 35 detects utterance again, the time delay is further shortened by the time period corresponding to the above silent time and then the audio is output from the speaker. The maximum value of the time delay to be shortened is the predetermined time of about 100 to 200 ms as described above, however, when the total of the time delays to be shortened several times reaches the above predetermined time, there is no time delay afterward and therefore the audio is output from the speaker in real time. When the first silent time is the same as the predetermined time or longer than that, the audio is output from the speaker in real time immediately after that.

Figure 3:
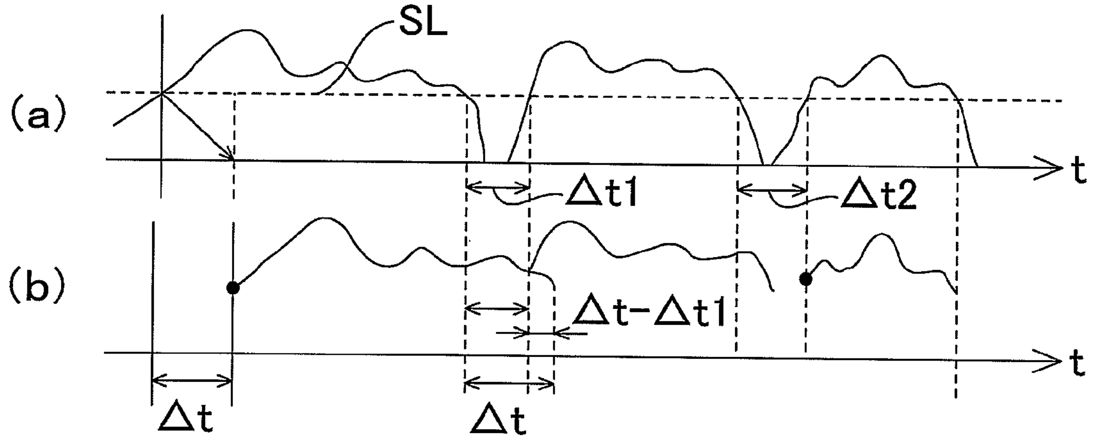
FIGS. 3(*a*) and 3(*b*) are waveform diagrams showing the operation in the embodiment.
Figure 4:
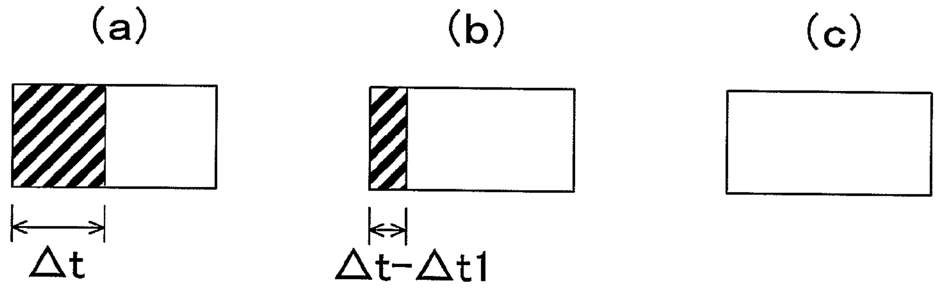
FIGS. 4(*a*) to 4(*c*) are conceptual diagrams sequentially showing an example of the operation of an audio data storage unit in the embodiment.
Figure 5:
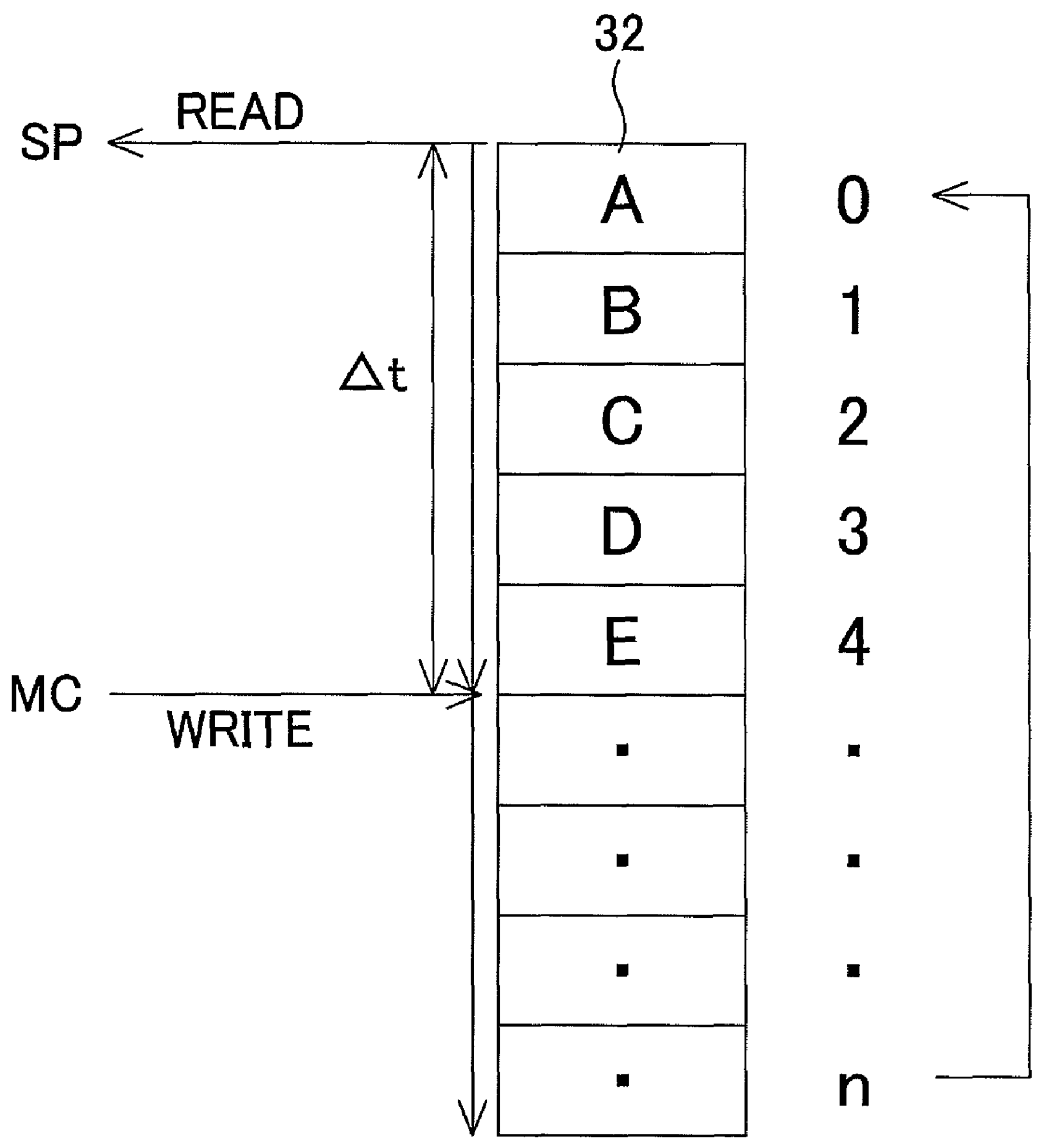
FIG. 5 is a schematic diagram showing an example of the operation of the audio data storage unit in the embodiment.

FIG. 3(*a*) to FIG. 5 show images of the operation in the embodiment. FIGS. 3(*a*) and 3(*b*) show the operation with an example of an audio signal waveform: FIG. 3(*a*) shows an analog audio signal converted by a microphone; and FIG. 3(*b*) shows an audio signal that is read from the audio data storage unit, converted into an analog signal, and output from a speaker. As shown in FIG. 3(*a*), the utterance or silence of the analog audio signal converted in the microphone is detected by the audio level detector depending on whether or not the predetermined threshold SL is exceeded. At the beginning of utterance, the audio is output from the speaker with a delay of $\Delta t$ from the analog audio signal converted in the microphone. FIG. 4(*a*) shows an image of the audio data storage unit at this time, showing that the reading is carried out with a delay corresponding to the capacity of memory corresponding to $\Delta t1$ of the limited amount of memory capacity.

When the analog audio signal converted in the microphone is interrupted temporarily and $\Delta t1$, the period of silent time at this time, is shorter than $\Delta t$, the time delay is shortened by $\Delta t1$ and the audio is output from the speaker with a time delay corresponding to $\Delta t-\Delta t1$ (refer to FIG. 4(*b*)). When the analog audio signal converted in the microphone is temporarily interrupted again and $\Delta t2$, the period of silent time at this time, is longer than $\Delta t-\Delta t1$, in other words, $\Delta t1+\Delta t2$ is longer than $\Delta t$, there is no time delay afterward, and the audio signal converted in the microphone is output from the speaker in real time (refer to FIG. 4(*c*)).

FIG. 5 is a conceptual diagram showing an example of the operation of writing and reading by the audio data storage unit 32. The audio data storage unit 32 has addresses from 0 to n. It is assumed that digital audio data, such as "A", "B", "C", "D", "E", . . . , converted into an electric signal in the microphone and converted by the analog/digital converter, are written in the order of the addresses. There is a limit to the number of addresses of the audio data storage unit 32 and when audio data are recorded up to the last address n, the order returns to the first in the form of a ring and the data are replaced with new data from address 0, 1, 2, . . . . When the audio level detector detects utterance, at first, the controller specifies the pointer of the audio data storage unit 32 with a delay of the addresses corresponding to the time delay $\Delta t$ as described earlier, and reads the digital audio data. In the example in FIG. 5, when "E" is written to the address 4, "A" in the address 1 written $\Delta t$ earlier than "E" is read. When the audio level detector detects a temporary silence, the read address is put nearer to the write address by the amount of addresses corresponding to the period of silent time and then the read address matches with the write address and the reading is carried out in real time.

As described above, according to the embodiment shown schematically, there occurs a time delay until the audio is output from the speaker at the start point of utterance, however, each time an instantaneous silent state occurs, the time delay is shortened and then the time delay is eliminated, and therefore, it is possible to prevent an uncomfortable feeling from occurring, which would occur in a conventional audio conferencing system having an automatic mute release device, and to obtain a conference audio system in which a speech can be easily heard by attendees.

INDUSTRIAL APPLICABILITY

A digital/analog converter that converts read audio data into an analog audio signal can constitute a conference audio system by driving a speaker with its analog-converted output, and, the analog-converted output of the digital/analog converter can be input to recorders, communication devices, and other devices for recording, communication, etc.

The invention claimed is:

1. A conference audio system comprising:

a plurality of microphones;

an analog/digital converter converting an audio signal from each microphone into a digital signal;

an audio level detector detecting utterance or silence depending on whether or not the level of the converted digital signal exceeds a predetermined level;

an audio data storage unit temporarily storing the digital signal which the corresponding utterance is detected by the audio level detector and the analog/digital converter converts;

a controller controlling the storage of audio data to the audio data storage unit and the reading of the stored audio data; and a digital/analog converter converting the read audio data into an analog audio signal, wherein the controller hastens read timing of the audio data in accordance with a time period of silent portion when the audio level detector detects silence in a series of the audio data.

2. The conference audio system according to claim 1, wherein the audio data storage unit stores past audio data by a predetermined amount while updating the audio data by using a memory in a form of a ring.

3. The conference audio system according to claim 1, wherein the analog/digital converter, the audio level detector, the audio data storage unit, the controller, and the digital/analog converter are arranged in accordance with each microphone.

4. The conference audio system according to claim 1, wherein the audio signal output from the microphone side is transmitted to a receiver via a cordless signal transmitter and a speaker is driven by the audio signal received by the receiver.

5. The conference audio system according to claim 1, wherein the controller keeps a microphone in an on state after the microphone for which the audio level detector detects utterance is turned on, until the detection of silence by the audio level detector continues for a predetermined time period.

6. The conference audio system according to claim 4, wherein the cordless signal transmitter and the receiver are a transmitter and a receiver using infrared light.

7. A conference audio system comprising:

a plurality of microphones;

an analog/digital converter converting an audio signal from each microphone into a digital signal;

an audio level detector detecting utterance or silence depending on whether or not the level of the converted digital signal exceeds a predetermined level;

an audio data storage unit temporarily storing the digital signal which the corresponding utterance is detected by the audio level detector and the analog/digital converter converts;

a controller controlling the storage of audio data to the audio data storage unit and the reading of the stored audio data; and a digital/analog converter converting the read audio data into an analog audio signal, wherein the controller controls read timing of the audio data.

8. The conference audio system according to claim 7, wherein the audio data storage unit stores past audio data by a predetermined amount while updating the audio data by using a memory in a form of a ring.

9. The conference audio system according to claim 7, wherein the analog/digital converter, the audio level detector, the audio data storage unit, the controller, and the digital/analog converter are arranged in accordance with each microphone.

10. The conference audio system according to claim 7, wherein the audio signal output from the microphone side is transmitted to a receiver via a cordless signal transmitter and a speaker is driven by the audio signal received by the receiver.

11. The conference audio system according to claim 7, wherein the controller keeps a microphone in an on state after the microphone for which the audio level detector detects utterance is turned on, until the detection of silence by the audio level detector continues for a predetermined time period.

12. The conference audio system according to claim 10, wherein the cordless signal transmitter and the receiver are a transmitter and a receiver using infrared light.

* * * * *